(12) United States Patent
Jones et al.

(10) Patent No.: US 7,802,088 B2
(45) Date of Patent: *Sep. 21, 2010

(54) AD HOC WIRELESS NETWORK CREATE/JOIN USER EXPERIENCE

(75) Inventors: David Jones, Seattle, WA (US); Srinivas Raghu Gatta, Redmond, WA (US); Savas Guven, Redmond, WA (US); Marieke I. Watson, Redmond, WA (US); Jean-Pierre Duplessis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1292 days.

This patent is subject to a terminal disclaimer.

(21) Appl. No.: 11/321,791

(22) Filed: Dec. 29, 2005

(65) Prior Publication Data

US 2007/0168553 A1 Jul. 19, 2007

(51) Int. Cl.
H04L 29/06 (2006.01)

(52) U.S. Cl. .................. 713/150; 713/151; 709/245; 709/225; 709/226

(58) Field of Classification Search .............. 709/201, 709/202, 203, 217, 218, 219, 220, 221, 222, 709/223, 224, 225, 226, 227, 228, 229, 249, 709/250

See application file for complete search history.

(56) References Cited

U.S. PATENT DOCUMENTS

| | | | |
|---|---|---|---|
| 5,822,309 A | 10/1998 | Ayanoglu et al. | |
| 6,212,559 B1* | 4/2001 | Bixler et al. | 709/221 |
| 7,546,357 B2* | 6/2009 | Manchester et al. | 709/220 |
| 7,616,588 B2* | 11/2009 | Gatta et al. | 370/254 |
| 2002/0069271 A1* | 6/2002 | Tindal et al. | 709/221 |
| 2002/0069274 A1* | 6/2002 | Tindal et al. | 709/223 |
| 2002/0069275 A1* | 6/2002 | Tindal | 709/223 |
| 2004/0021681 A1 | 2/2004 | Liao | |
| 2004/0174896 A1 | 9/2004 | Caspi et al. | |
| 2004/0249915 A1 | 12/2004 | Russell | |
| 2004/0249925 A1 | 12/2004 | Jeon et al. | |
| 2004/0258390 A1 | 12/2004 | Olson | |
| 2005/0113139 A1 | 5/2005 | Boss et al. | |
| 2005/0149204 A1* | 7/2005 | Manchester et al. | 700/1 |
| 2005/0198221 A1 | 9/2005 | Manchester et al. | |
| 2005/0204026 A1 | 9/2005 | Hoerl | |
| 2006/0120306 A1* | 6/2006 | Bonal et al. | 370/254 |

OTHER PUBLICATIONS

"Windows XP Service Pack 2: How it Affects Wireless Networking," CNET Networks, Inc. 2005, http://techrepublic.com.com/5100-23-5320782-2.html.
"Asus WiFi@Home Slot 802.11g Wireless LAN PCI Network Interface Card Adapter (Retail)," eXtreme PC gear.com 2005, http://www.xpcgear.com/asuswifipcig.html.
"CiscoWorks Wireless LAN Solution Engine Express 2.11," Cisco Systems, Inc. 1992-2005, http://www.cisco.com/en/US/products/ps6379/products_data_sheet0900aecd80283076.html.

* cited by examiner

Primary Examiner—Pramila Parthasarathy
(74) Attorney, Agent, or Firm—Marshall, Gerstein & Borun LLP

(57) ABSTRACT

A user interface for creating and joining meetings over a peer-to-peer network involves presentation of user interface windows including windows for selecting parameters corresponding to the ad-hoc network, activating sharing of Internet connections and joining an existing ad-hoc network by entering network name and optional password. The user interface further provides for entry of a country to select an appropriate wireless network protocol for use in that country when an attached wireless device supports such agility, for example, an 802.11(d) wireless network adapter.

18 Claims, 15 Drawing Sheets

AD HOC WIRELESS NETWORK
CREATE/JOIN USER EXPERIENCE

BACKGROUND

The advent of wireless networks, particularly short range wireless networks, such as IEEE 802.11 have enabled a new level of flexibility to users of wireless devices, such as a laptop computer using a wireless network adapter. In most embodiments, wireless networks support client devices (e.g. the laptop/adapter) accessing a fixed wireless access point providing access to a local area network, corporate network or the Internet. Even though most wireless networks are configured for mobile-to-fixed operation, many wireless network adapters support direct communication, or ad hoc networking, when correctly configured.

However, the configuration of a wireless network adapter is cumbersome at best and requires detailed knowledge of the network adapter configuration, protocol, and security. Further, to be useful more than one wireless device must be present, requiring reconfiguring more than one device onto the same ad hoc network. The knowledge required in the overall difficulty associated with setting up an ad hoc network has severely limited their use.

SUMMARY

A user experience for creating and joining ad hoc networks develops the notion of a network initiator and a network joiner. A simplified user experience presents the user with a series of screens or windows for naming and selecting parameters associated with an ad hoc network from the network initiate or perspective. Once the network is established, a second simplified user experience allows other users join the ad hoc network by identifying and selecting from available wireless networks and providing for convenient entry of required data, such as a password. Once the ad hoc wireless network is established, the simplified user experience also provides options for joining the ad hoc network to the Internet or other services such as a projector or shared file.

By combining functions ranging from wireless network adapter configuration, to peer-to-peer network discovery, to file and Internet sharing set up, the simplified user experience greatly enhances access to in the usefulness of ad hoc wireless networks.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
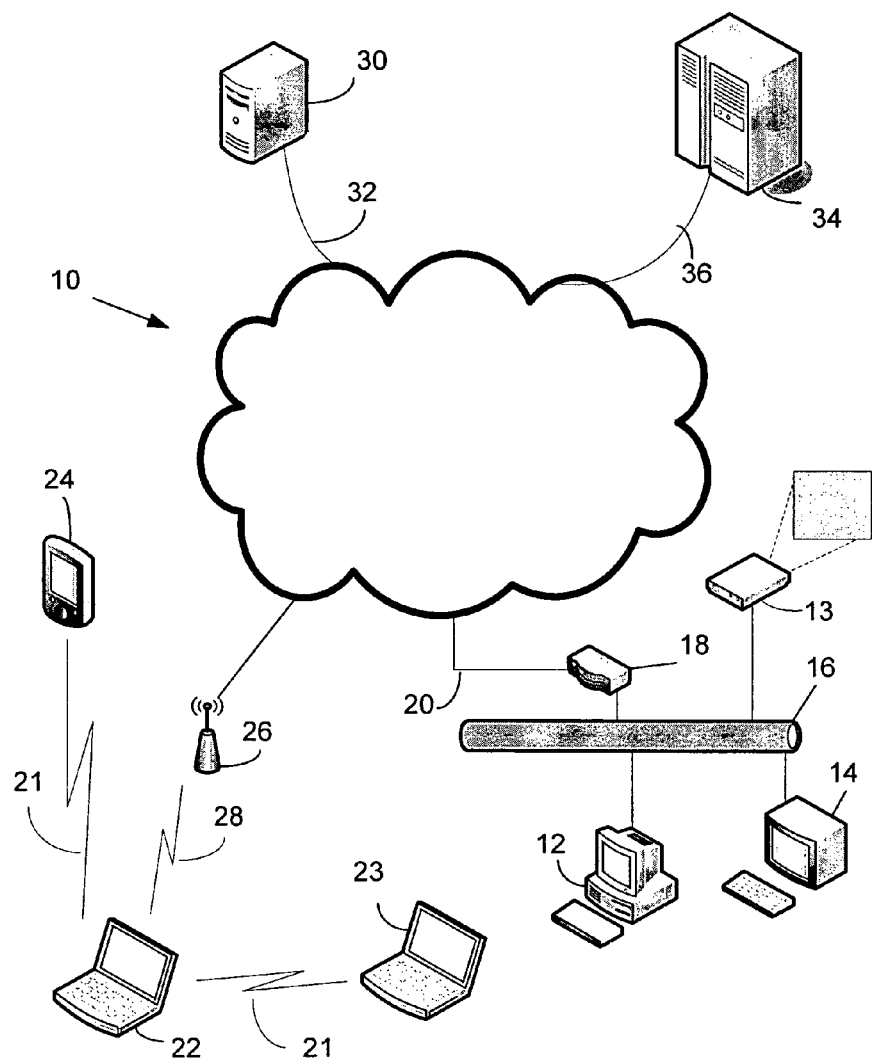
FIG. 1 is a simplified and representative block diagram of a computer network with an ad hoc wireless network.
Figure 2:
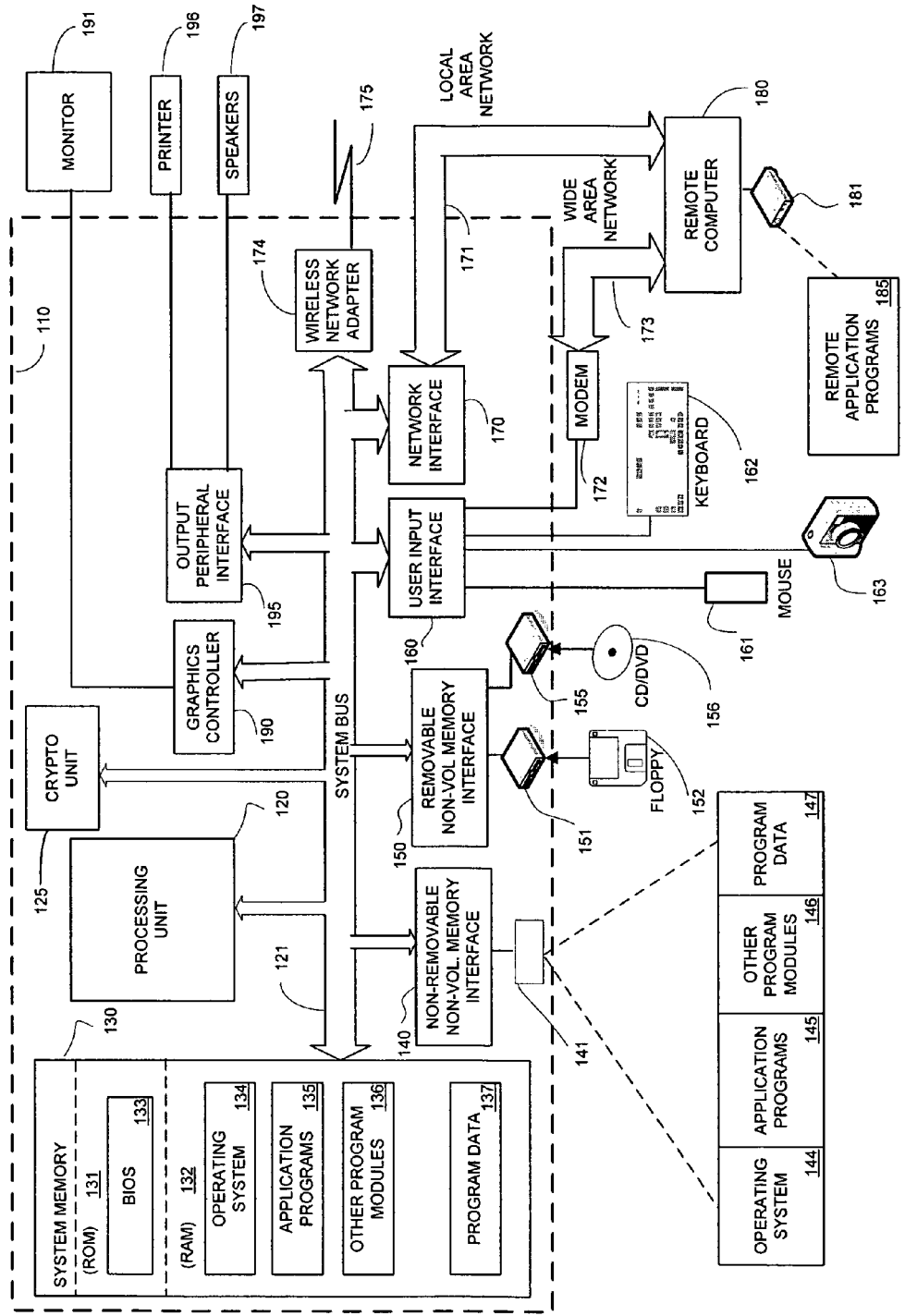
FIG. 2 is a block diagram of a computer that may be connected to the network of FIG. 1.

FIGS. 1 and 2 provide a structural basis for the network and computational platforms related to the instant disclosure.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12, a computer terminal 14, via an Ethernet 16 and a router 18, and a landline 20. The Ethernet 16 may be a subnet of a larger Internet Protocol network. Other networked resources, such as a projector 13, may also be supported via the Ethernet 16 or another data network. An ad hoc network 21 may connect a laptop 22 with another laptop 23 and a personal digital assistant (PDA) 24. The laptop 22 may also be connected to the network 10 via a wireless access point 26 and a wireless link 28. Similarly, a server 30 may be connected to the network 10 using a communication link 32 and a mainframe 34 may be connected to the network 10 using another communication link 36.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 125. The cryptographic unit 125 may have a calculation function that may be used to verify digital signatures, calculate hashes, digitally sign hash values, and encrypt or decrypt data. The cryptographic unit 125 may also have a protected memory for storing keys and other secret data. In addition, the cryptographic unit 125 may include an RNG (random number generator) which is used to provide random numbers. In other embodiments, the functions of the cryptographic unit may be instantiated in software or firmware and may run via the operating system or on a device.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163 such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173 and a wireless network 175, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. The wireless network adapter 174 which may be fixed or removable may be connected to the system bus 121. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
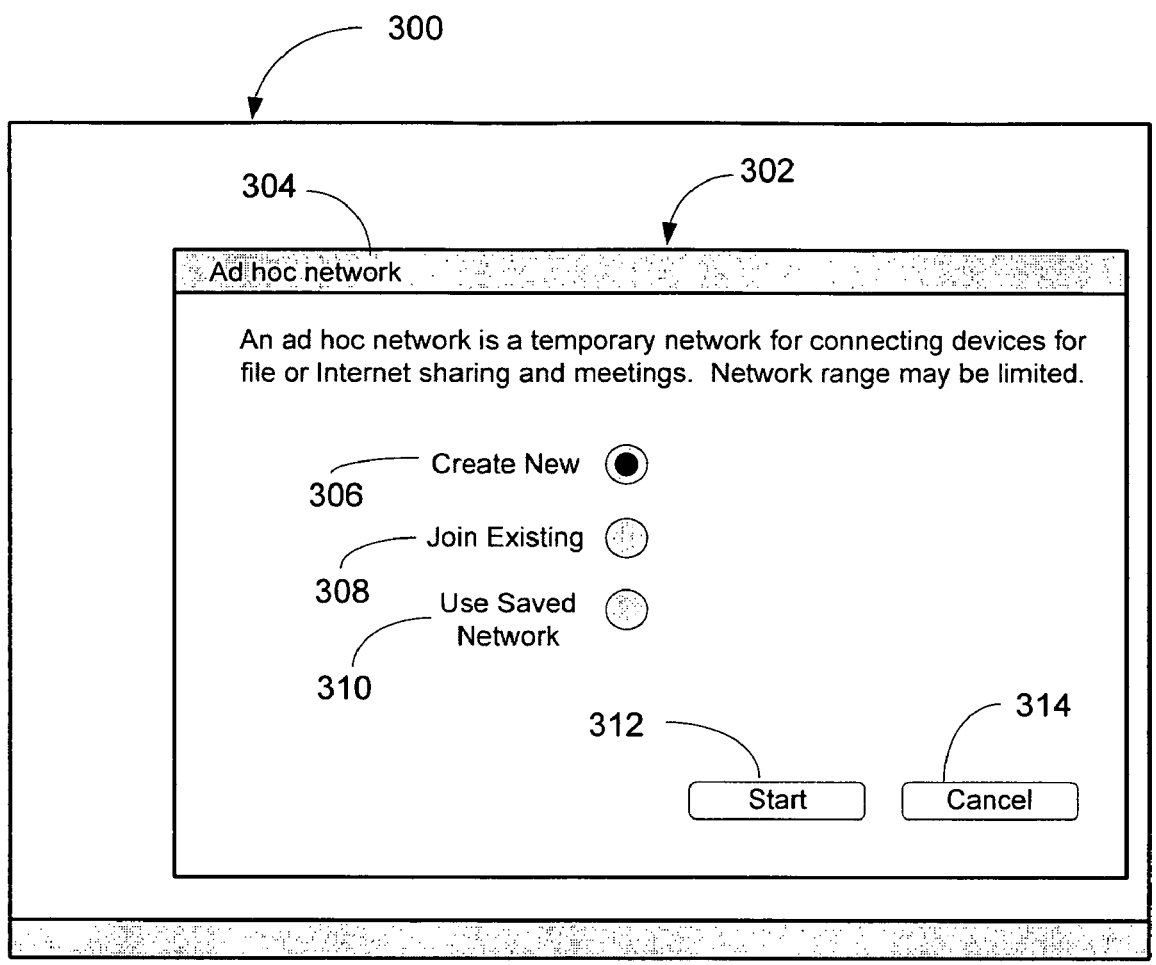
FIG. 3 is a simulated computer display showing a window presenting a user interface for initiating participation in an ad hoc network.

FIG. 3 depicts a computer display 300 showing a window 302 for initiating participation in an ad hoc network 21. The title bar 304 indicates the window 302 is associated with ad hoc networking. The window 302 includes a series of radio button selectors, as is known in the art. Radio buttons allow selection of a single item from a list of items, in this case, a create new ad hoc wireless network button 306, a joined existing ad hoc wireless network button 308, and a use saves network button 310. The window 300 to may also include a start button 312 and they cancel button 314 for either initiating the activity selected or canceling enclosing window 302.

Figure 4:
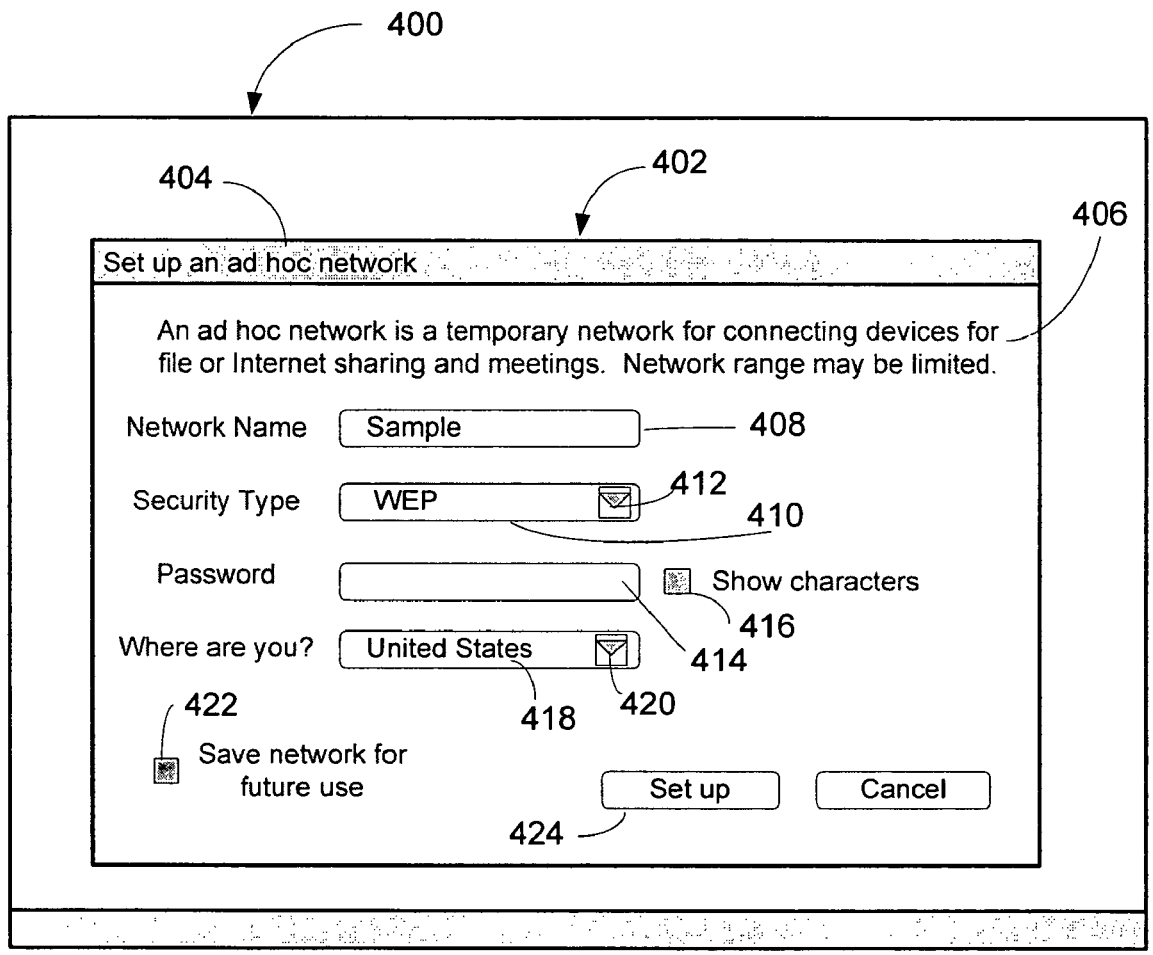
FIG. 4 is a simulated computer display showing a window presenting a user interface for initiating a new ad hoc network.

FIG. 4 depicts a computer display 400, and a window 402. The window 402 includes a title bar 404. This window 400 may be used to set up an ad-hoc wireless network, such as ad-hoc wireless network 21 of FIG. 1 by a network creator or initiator. The window 400 may include explanatory text 406 directed to the purpose and characteristics of an ad-hoc wireless network. A first data entry field 408 may be used to input a network name. The network name may be chosen at the convenience of the network creator, that is, there need be no particular constraints on the naming convention. The name "Sample" is shown and used throughout the exemplary embodiment described, but could be "Staff meeting" or "12345."

A second data entry field 410 may be used to input a security type. The security type may define the nature of the cryptographic services invoked and the relative security of the session. The choices for security type may be offered using a drop down box, whereby selecting the drop down icon 412, a list of available choices may be shown. The selections available through the drop down icon 412 may be limited by the type of adapter, e.g. what security protocols are supported by the adapter, and the support services available for key generation, etc. A security type of 'none' may be specified allowing unrestricted participation in the ad-hoc wireless network 21. Another selection may be Wired Equivalent Privacy (WEP). WEP keys are typically 5-13 ASCII characters or 10-26 hexadecimal characters. Another embodiment may allow entry of a passphrase of 8-63 characters from which a 10 digit hexadecimal (40 bit) key is generated. Another security type may be Wi-Fi Protected Access 2 (WPA2). The WPA2 key may be between 8 and 63 characters. In one embodiment, an easy setup facility may be made available. The easy setup facility may allow the user to enter a password between 8 and 63 characters and a 26 digit (104 bit) hexadecimal WEP key is generated. The user may forward the password for users with systems that support easy setup or may forward the generated key for use on legacy systems. The use of a flash drive to transfer settings may also be used on compatible systems.

In conjunction with the security type selection, the password or security key, if required, may be entered at a third data entry field 414. Because the password is forwarded to others for use in joining the ad-hoc wireless network, a selection box 416 may be used to show the characters of the password. By showing the characters, a user is afforded visual confirmation of the password characters and may access the string for forwarding to others.

The standards for wireless network connections vary from country to country. For example, the various 802.11 protocols may call for different frequencies in different countries, as well as variations in modulation schemes. A standard defined by IEEE 802.11(d) allows protocol agility in a wireless network adapter, such as wireless network adapter 174. When the wireless network adapter 174 supports IEEE 802.11(d) functionality, a fourth data entry field 418 may be made available. By specifying the county of operation in the fourth data entry field 418, for example, using a drop down menu selection activated by drop down icon 420, the current locale of the wireless network adapter 174 may be captured and the frequencies and protocol adjusted accordingly.

The ad-hoc wireless network 21 may be set to time out after a predetermined timeout period, for example, 60 minutes. A selection box 422 may be used to override the predetermined timeout period and persist the network until manually closed. Selections made using the selection box 422 or a configuration table (not depicted) may be overridden by a group policy set at an administrator level. When the user is satisfied with the data entered and options selected, the set up button 424 may be selected to begin the ad-hoc wireless network activation process.

Figure 5:
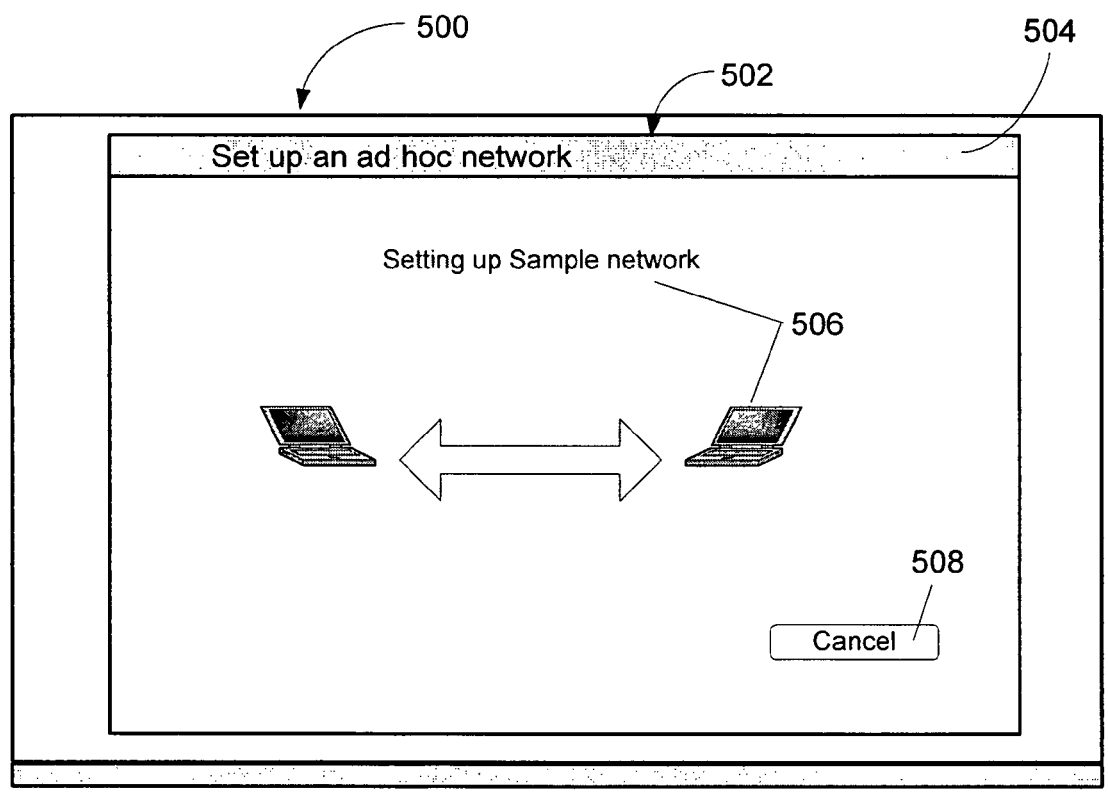
FIG. 5 is a simulated computer display showing another window presenting a user interface for initiating an ad hoc network.

FIG. 5 depicts a computer display 500 and a window 502 having a title bar 504. The window 502 may include textual and/or graphical indications 506 that the ad-hoc wireless network 21 is being set up. A cancel button 508 allows the user to terminate the set up process.

Figure 6:
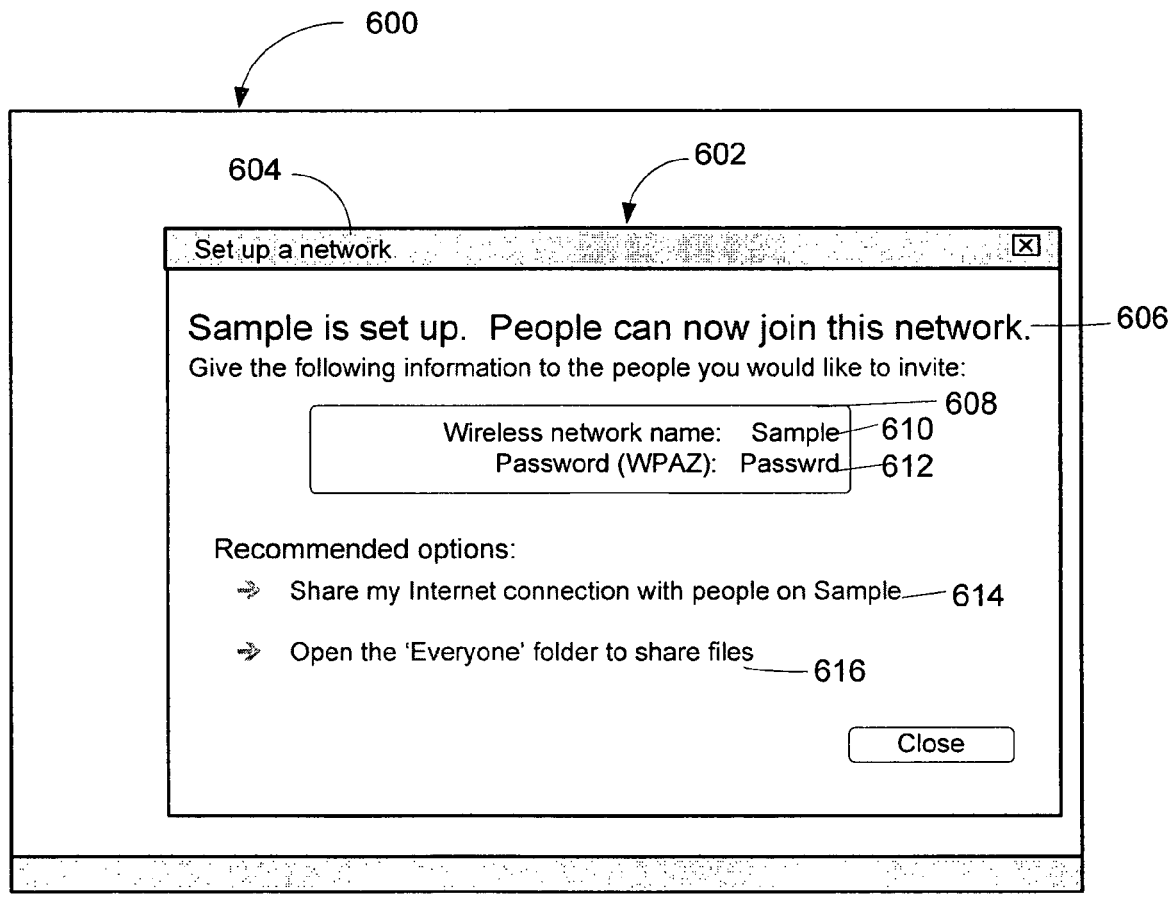
FIG. 6 is a simulated computer display showing another window presenting a user interface for initiating an ad hoc network.

FIG. 6 depicts a computer display 600 and a window 602 having a title bar 604 indicating that the ad-hoc wireless network 21 has successfully completed the set up process. A text box 608, or equivalent graphics, may indicate to the user the name 610 of the ad-hoc wireless network 21 and, optionally, the password 612, in this example, the password is shown as 'passwrd.'

FIG. 6 also depicts several options that may be made available to the meeting initiator or a subsequent meeting joiner. A first selector 614 activates a process for sharing an Internet connection with other members of the ad-hoc wireless network 21. Internet sharing is discussed further below. A second selector 616 shares a folder, in this example, a folder named 'Everyone.' Folder sharing may simply allow all users on the ad-hoc wireless read and write access to the shared folder for placing and retrieving files that users wish to be made available among meeting participants.

Figure 7:
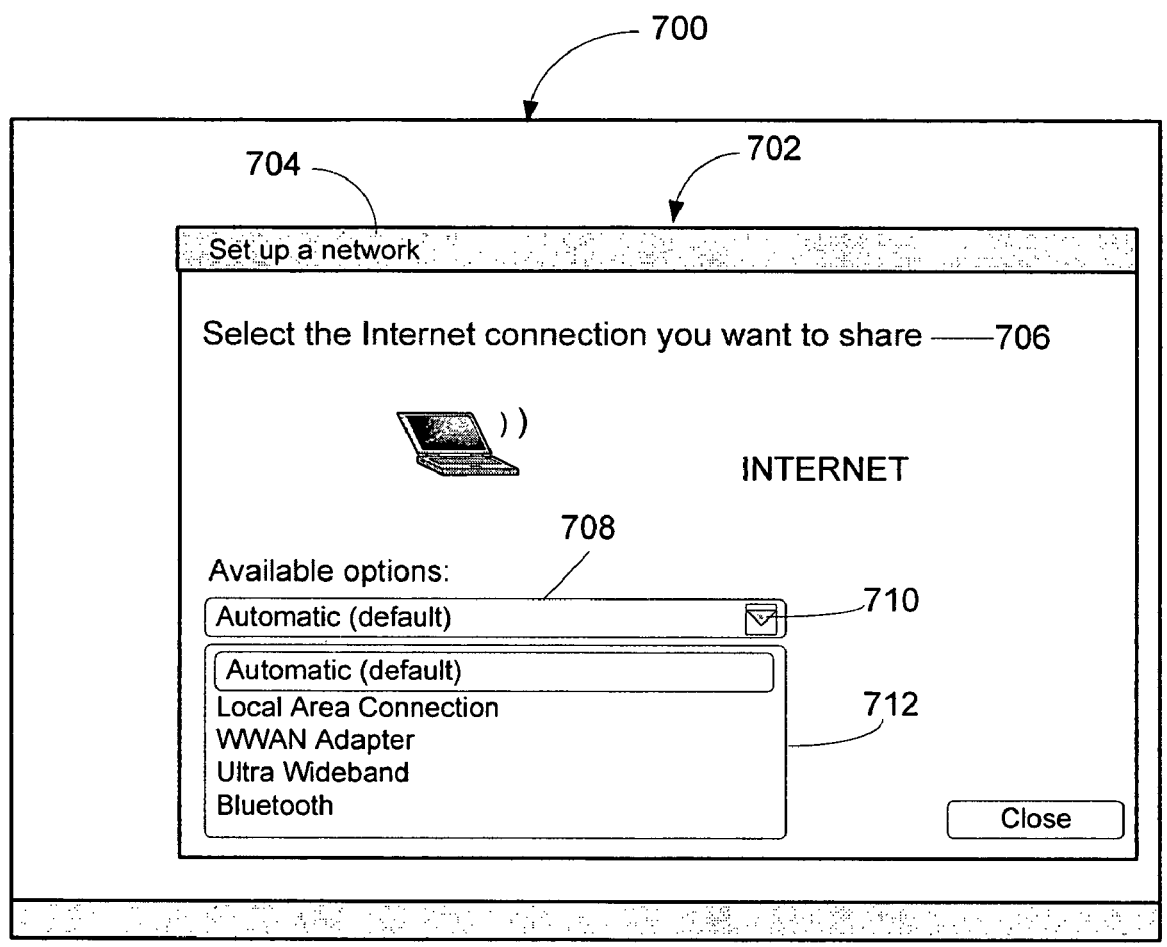
FIG. 7 is a simulated computer display showing another window presenting a user interface for initiating an ad hoc network.

FIG. 7 depicts a computer display 700 and a window 702 having a title bar 704. The window 702 may be activated responsive to activation of the first selector 614 of FIG. 6 for sharing an Internet connection, for example, connection 28. Some computers, such as computer 22, may have more than one network connection, such as wireless network adapter 174 and a network interface 170. The network interface may be wired, but may also support additional wireless network connections, for example, a wide area high speed cellular network interface (WWAN), Bluetooth, or ultra-wideband (UWB) connection. Any or all of these additional network connections may be capable of coupling to the Internet, depending on configuration and available support. A future wireless network adapter may support simultaneous wireless connection to different networks using the same adapter.

The window 702 of FIG. 2 may include instructions 706 and support a drop down box 708 activated by a drop down icon 710. The drop down box 708, here as above, may be configured such that they only offer choices that are actually available. For example, a wired network adapter, such as network interface 170, that is unplugged may be removed from the selection list 712 when the selection list 712 is displayed or even in real time. Making a selection from the selection list 712 may cause designated traffic from the ad-hoc wireless network 21 to be routed through to the Internet.

Figure 8:
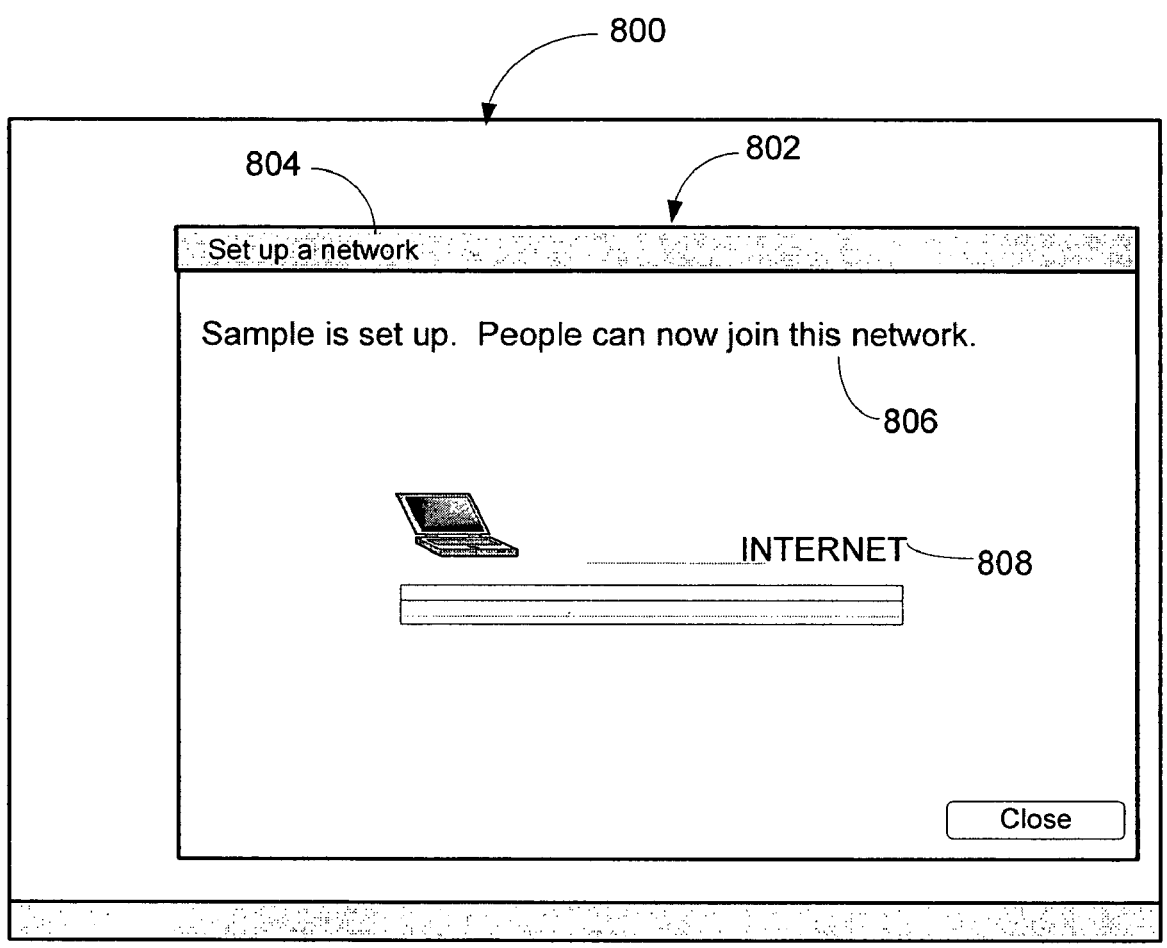
FIG. 8 is a simulated computer display showing another window presenting a user interface for initiating an ad hoc network.

FIG. 8 depicts a computer display 800 having a window 802 with a title bar 804. A text message 806 may inform the user that the ad-hoc wireless network 21 is set up. An additional indication 808 shows that the Internet is also available to the ad-hoc wireless network 21.

Figure 9:
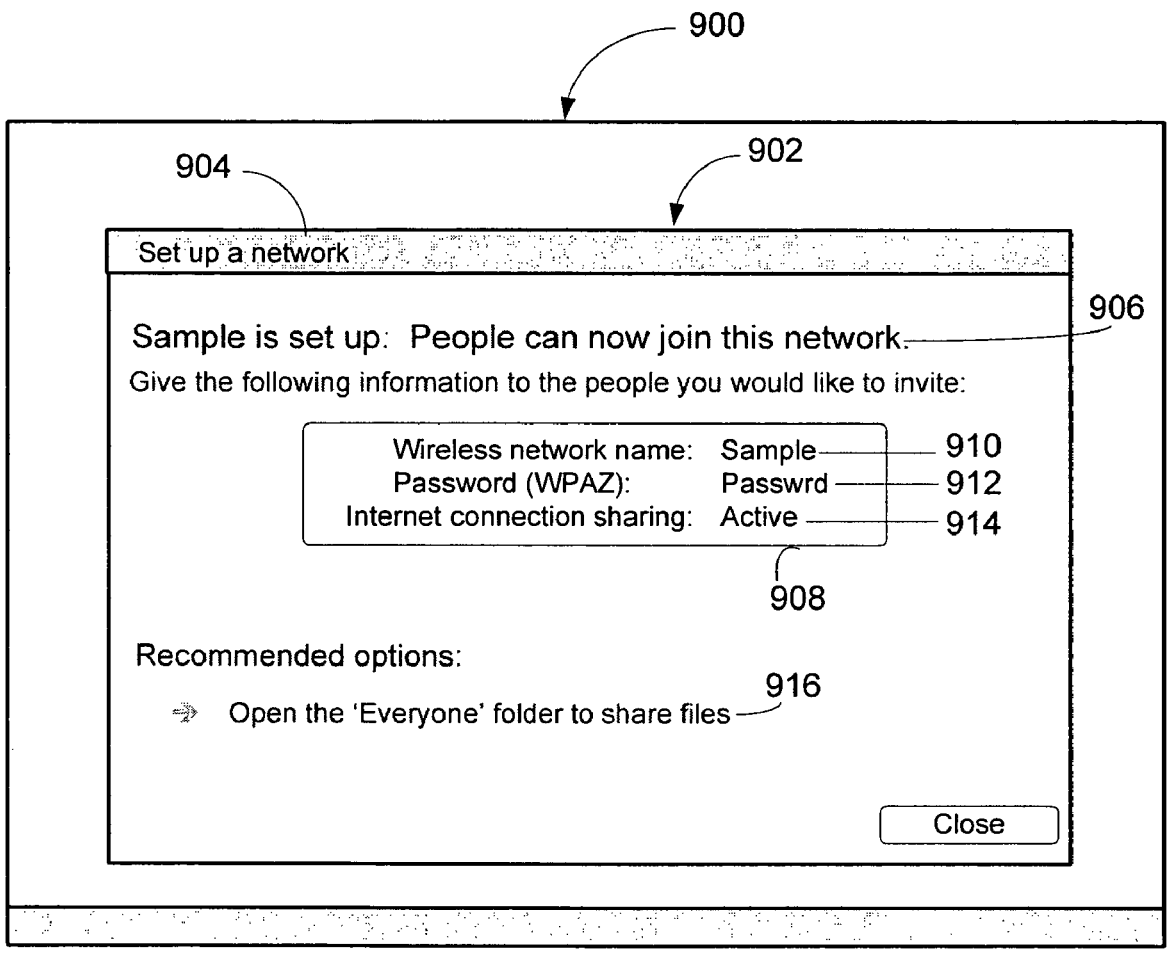
FIG. 9 is a simulated computer display showing another window presenting a user interface for initiating an ad hoc network.

FIG. 9 depicts a computer display 900 having a window 902 with a title bar 904, similar to the window 602 of FIG. 6. Descriptive text 906 may indicate to the user that the ad-hoc wireless network 21 is set up and available. A text box 908 may display the wireless network name 912, in this 'Sample,' may be displayed along with the password 912. An indication that Internet connection sharing is active is shown by the designation 914. Because the Internet connection sharing is already active, no Internet sharing selector corresponding to the selector 612 of FIG. 6 is displayed, while the file sharing selection 916 is still displayed, indicating that a shared folder has not been opened.

FIG. 4 through FIG. 9 illustrated some of the windows available in an exemplary embodiment for setting up an ad-hoc wireless network 21 and discuss functionality from the network initiator point of view. FIG. 10 through FIG. 15 show sample embodiment screens from a network joiner perspective.

Figure 10:
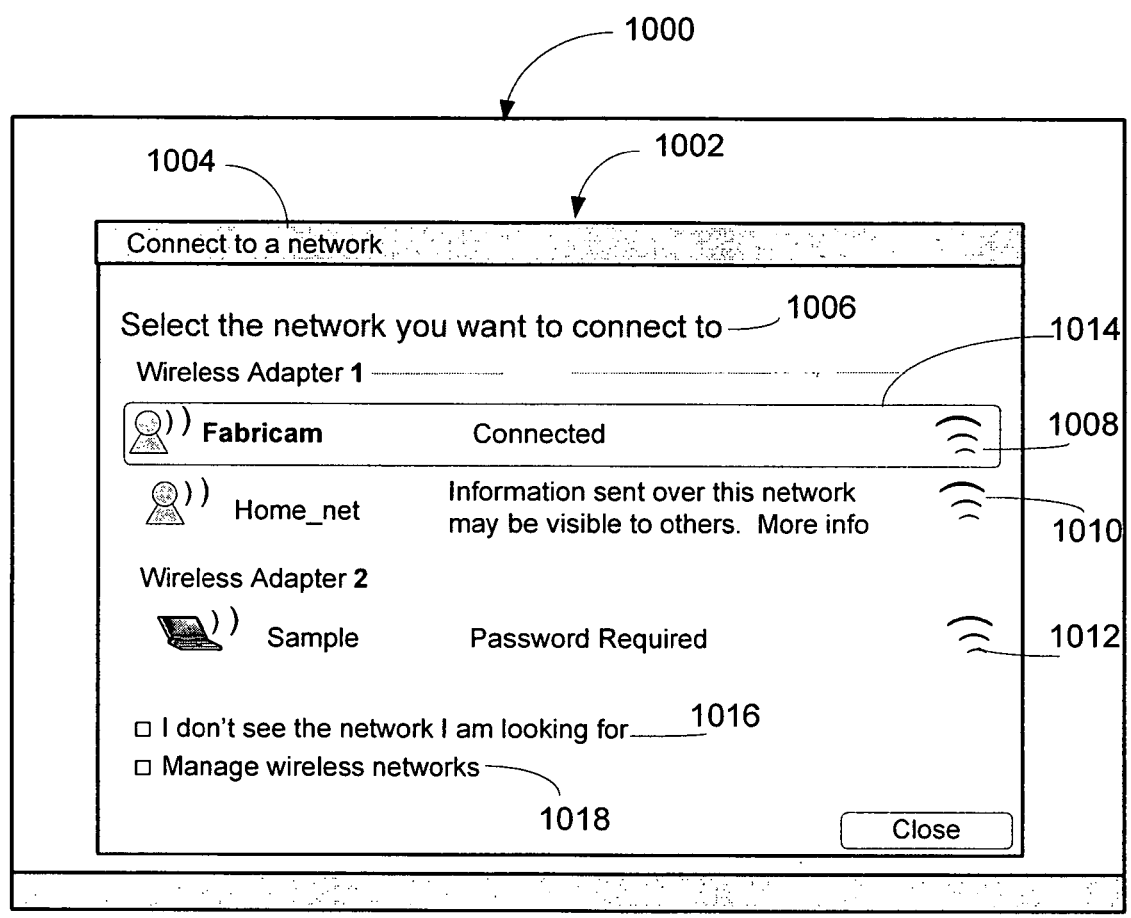
FIG. 10 is a simulated computer display showing a window presenting a user interface for joining an ad hoc network.

FIG. 10 depicts a computer display 1000 having a window 1002 with a title bar 1004. Instructional text 1006 informs the user to select a network for connection from a list of available networks. Available networks are depicted by a list of available networks, in this example, network Fabricam 1008, network Home_net 1010, and network Sample 1012. A selection box 1014 may be scrolled to highlight the selected network. Additional selections may be made available, for example, a selection 1016 may allow manual entry of network data and a second selection 1018 may allow a user to manage wireless networks, for example, the networks initiated by the user. When a selection of a network is made, the following screen may be made available to the user.

Figure 11:
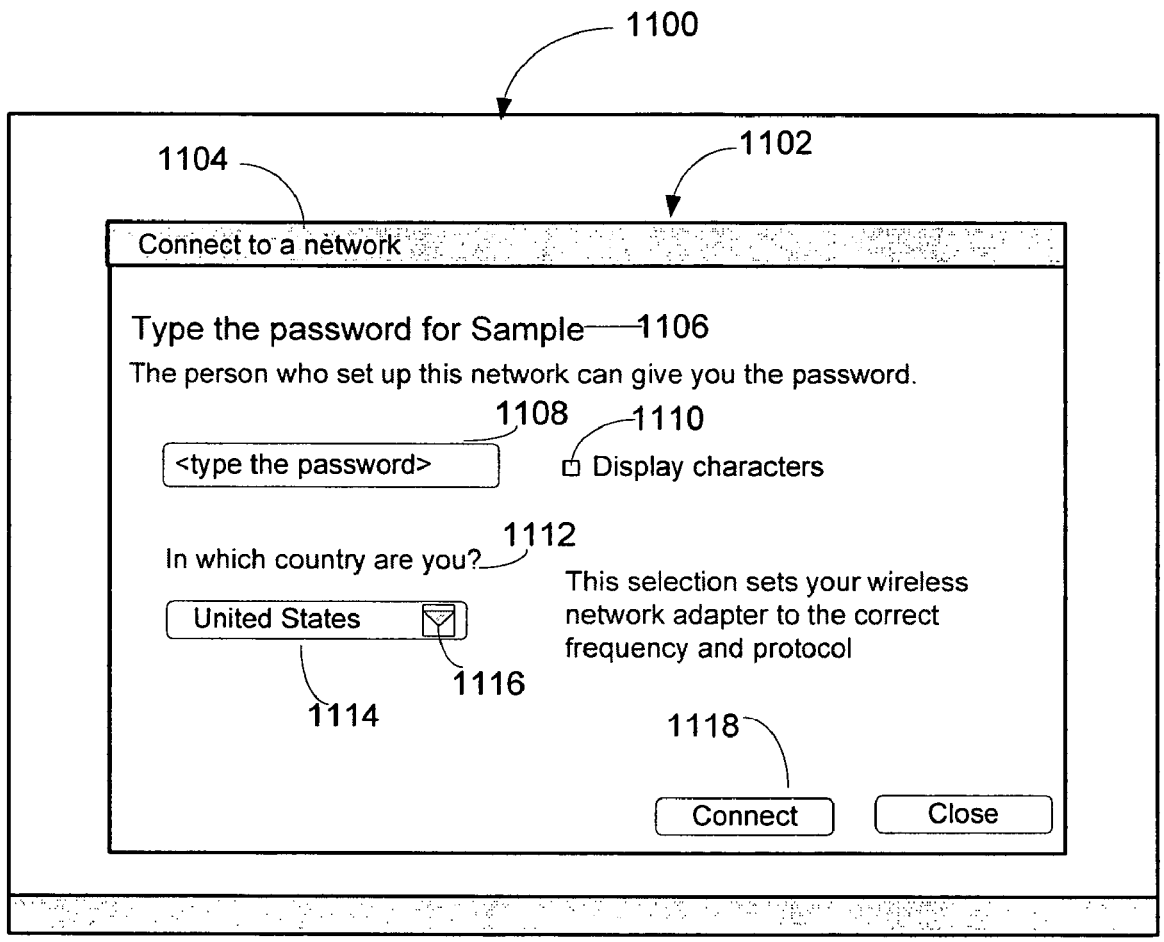
FIG. 11 is a simulated computer display showing another window presenting a user interface for initiating an ad hoc network.

FIG. 11 depicts a computer display 1100 having a window 1102 with a title bar 1104. An instruction line 1106 may inform the user to enter data, such as a password, for connecting another computer, e.g. computer 23, to the selected network. The password received from the user may be entered in a first data entry field 1108. To enable verification of the data entry, selection of box 1110 will disable the suppression of the password characters so the actual typed characters may be viewed. The activity associated with the password entry may vary based on the type of security selected. When easy setup is supported, the user may enter the password and a secure connection made with the host computer, e.g. computer 22. When the password is verified, the wireless settings may be downloaded and used for the ad-hoc wireless network connection. When using a legacy system, the user may enter the hexadecimal key and a connection attempted. When using a WEP generated key, the user may enter the WEP password or network key. If the password is entered, the 10 digit hexadecimal key is generated and used for establishing the session.

When the wireless network adapter 174 supports IEEE 802.11(d), the question related to country of operation 1112 may be displayed along with the selection box 1114 and drop down icon 1116. When satisfied with the data entries and/or selections, the 'Connect' button 1118 may be selected and the process of connecting to the selected network initiated.

Figure 12:
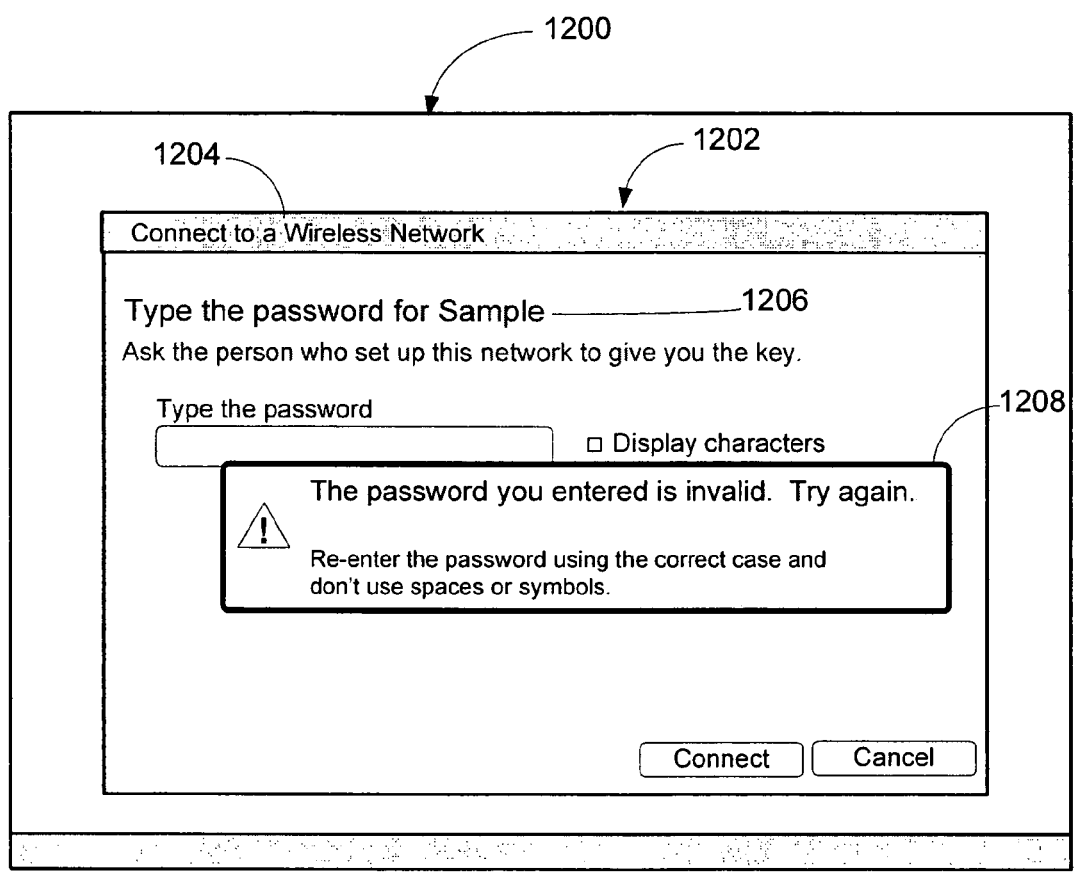
FIG. 12 is a simulated computer display showing another window presenting a user interface for initiating an ad hoc network.
Figure 13:
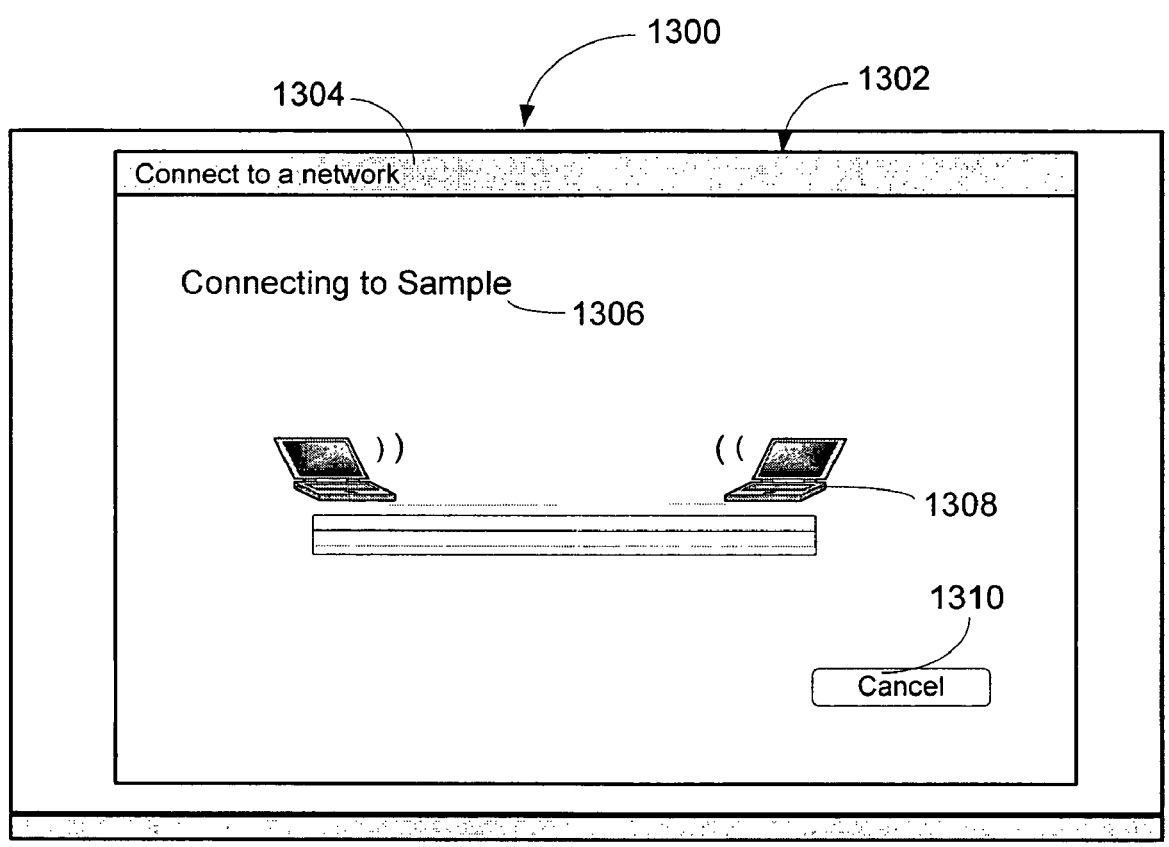
FIG. 13 is a simulated computer display showing another window presenting a user interface for initiating an ad hoc network.

Several error conditions may arise, one such condition illustrated in FIG. 12. A computer display 1200 is shown having a window 1202 with a title bar 1204. A description 1206 corresponding to the previous data entry window 1102 may be shown underneath an error message 1208. This error message indicates that the password entered has not been accepted or is otherwise flawed (wrong length, illegal characters, etc.). The user may clear the error text and re-enter the password as described above.

FIG. 12 depicts a computer display 1300 having a window 1302 with a title bar 1204. Text 1306 indicates a connection to the selected ad-hoc wireless network 21 is in progress. A graphical view including a progress bar 1208 may be used to give visual feedback to the user regarding the state of the connection attempt. The cancel button 1310 may be selected to halt the process of joining the ad-hoc wireless network 21.

Figure 14:
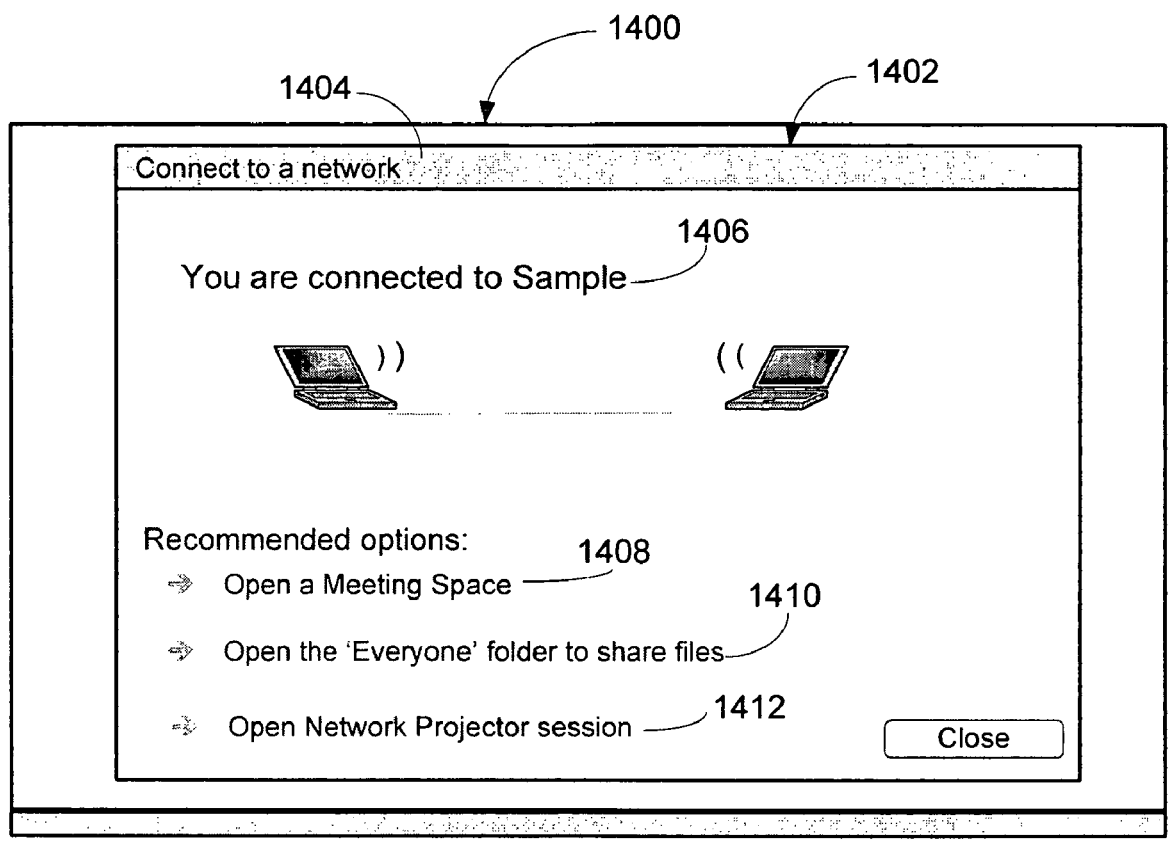
FIG. 14 is a simulated computer display showing another window presenting a user interface for initiating an ad hoc network.

FIG. 14 depicts a computer display 1400 having a window 1402 with a title bar 1404. A text message 1406 indicates that the connection was successful. As above, options may be available to the user. In this embodiment, an option to open an on-line meeting space may be offered through selection 1408. An online meeting space may include chat sessions, a shared whiteboard and audio conferencing, for example, between local participants and one joining through a connection 28 coupled to the Internet. As described above, an option to open a shared folder may be made through selection 1410. Another selection 1412 may allow connection to a network projector, for use in live meeting presentations, either by a remote presenter or a local presenter.

Figure 15:
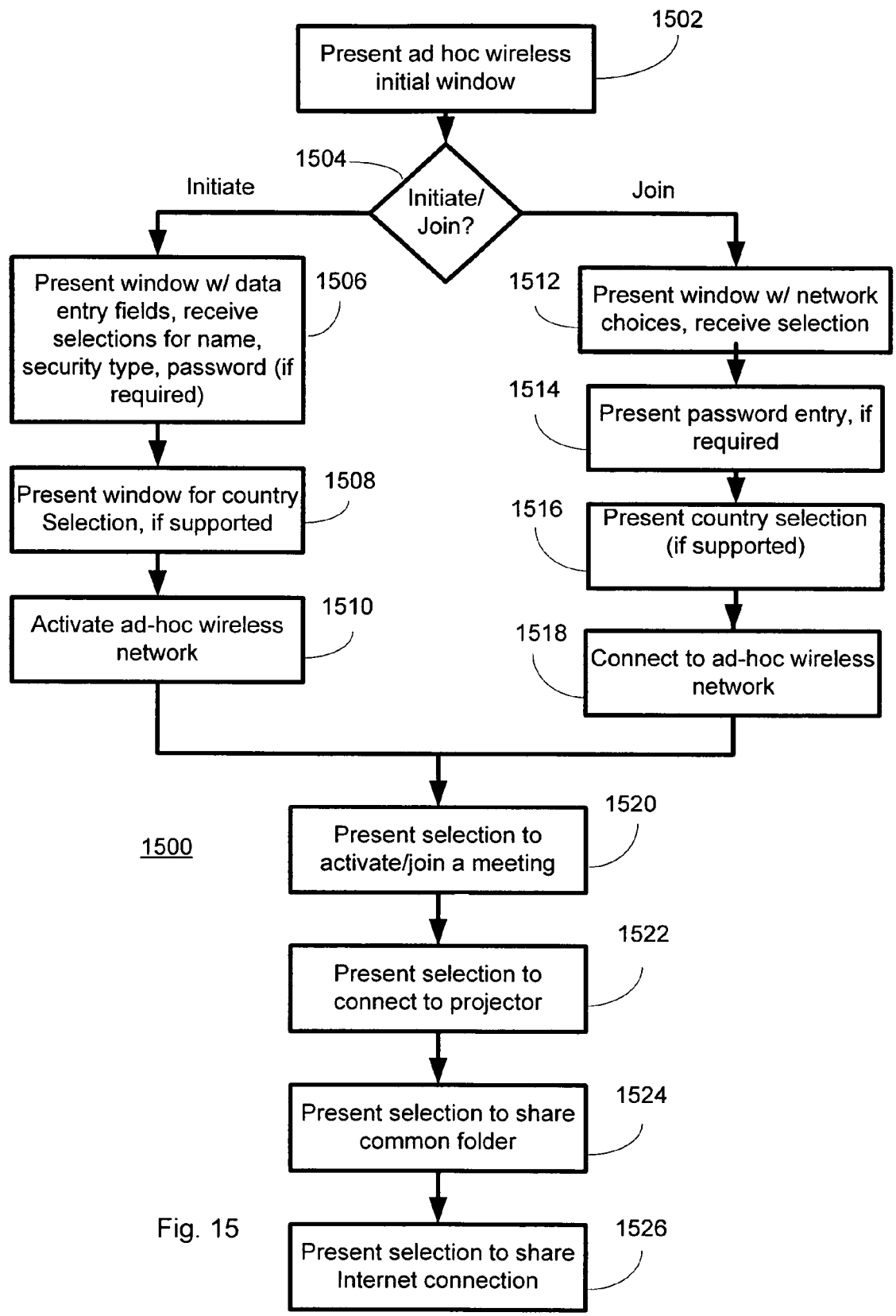
FIG. 15 is a flow chart of a method of presenting a simplified user experience for participating in an ad hoc wireless network.

FIG. 15, a method 1500 of presenting a simplified user experience for participating in an ad hoc wireless network is discussed and described. An initial ad hoc wireless window 302 may be presented at block 1502 to a first user wishing to initiate an ad hoc wireless network. The first user selection may be received and a decision at block 1504 may be used to determine whether the first user wants to initiate a wireless ad hoc wireless network or join an existing ad hoc wireless network. At block 1506, the first user may be presented with a window 402 for entering a network name, a security type, and a password. When supported by the wireless network adapter 174, a selection of country of operation may be made at block 1508. When all data entry has been completed and option selections made, as described above, the ad hoc wireless network may be activated at block 1510.

A second user, a network joiner, is wishing to join the ad hoc wireless network may also begin with the initial ad hoc wireless window 302 presented at block 1502. Because the second user is aware of an existing network he or she may choose to follow the join branch from block 1504. At block 1512 the second user may be presented with a window 1002 displaying a selection of networks available for joining. A selection may be received and at block 1516, a data entry field may be presented for receiving a password entry, if required. At block 1514, a selection may be made available for selecting country of operation, if supported. At block 1518, when the required fields have been completed and optional selections made, a connection to the ad hoc wireless network may be made.

Both the network initiator and the network joiner, that is, the first and the second user, may be presented with an option to activate or join a meeting space at block 1520. At block 1522, the first and second user may be presented, separately, with an opportunity to connect to a projector for displaying information to an audience. At block 1524, an option to share a common folder may be presented to the first and second user on their respective ad hoc wireless network windows 602 1402. At block 1526, the users may be given an opportunity to open a connection to the Internet for sharing with other participants in the ad hoc wireless network.

The overall user experience, involving both network initiators and network joiners, using the user interface elements described above greatly simplify the process of starting and participating in ad-hoc wireless networks. As wireless devices proliferate, the need for simple to use and secure ad-hoc wireless networks will increase. The benefit to users of not having to plug into hubs or enter lengthy network key strings and parametric settings will be apparent in higher quality meetings and better communication with less frustration.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computer-readable memory storage medium having computer-executable instructions implementing a method for presenting a user interface for creating an ad-hoc network on a peer-to-peer network infrastructure comprising: presenting a first window comprising: a first data entry field for receiving a network name; a second data entry field for receiving a selection of a security type; a third data entry field for receiving zero or more password characters; a selection button for initiating creation of the ad-hoc network; and creating the ad-hoc network in accordance with data received via the first window.

2. A computer-readable memory storage medium having computer-executable instructions implementing the method of claim 1, wherein the first window further comprises a fourth data entry field for receiving a selection of a country for determining wireless network configuration parameters.

3. A computer-readable memory storage medium having computer-executable instructions implementing the method of claim 1, wherein the first window further comprises a selection box for persisting the network beyond a timeout period.

4. A computer-readable memory storage medium having computer-executable instructions implementing the method of claim 1, wherein the second data entry field is a drop-down box offering a selection of security types including at least one of wired equivalent privacy (WEP), WiFi Protected Access (WPA2), and no encryption.

5. A computer-readable memory storage medium having computer-executable instructions implementing the method of claim 1, further comprising: presenting a second window indicating activity in progress related to creation of the ad-hoc network, the second window comprising: a selection button for canceling the creation of the ad-hoc network.

6. A computer-readable memory storage medium having computer-executable instructions implementing the method of claim 1, further comprising: presenting a third window indicating activation of the ad-hoc network, the third window comprising: a first selector for initiating sharing of an Internet connection when available; and a second selector for sharing a data folder when currently inactive.

7. A computer-readable memory storage medium having computer-executable instructions implementing the method of claim 6, further comprising: presenting a fourth window responsive to selection of the first selector for initiating sharing of an Internet connection, the fourth window comprising: a drop-down box presenting a selection of available network connections providing access to the Internet.

8. A computer-readable memory storage medium having computer-executable instructions implementing the method of claim 7, further comprising: presenting a fifth window responsive to successful connection to the Internet using a selected network connection, the fifth window comprising: an indication that Internet connectivity is available.

9. A computer-readable memory storage medium having computer executable instructions for implementing a method of presenting a user interface for joining an existing ad-hoc network comprising: presenting a first window comprising: a list of networks available for connection; a selection highlight indicating a selected network, the selection highlight scrollable through the list of networks available for connection; and a selection box for activating a supplemental network selection screen; whereby an activation signal triggers a process for connection to the selected network; and presenting another window including a message indicating successful connection to the selected network.

10. A computer-readable memory storage medium having computer executable instructions for implementing the method of claim 9, further comprising: presenting a second window responsive to the activation signal, the second window comprising: a first data entry field for entering a password; a character display selection for setting suppression of characters of the password; and a second data entry field for receiving a selection of a country for determining wireless network configuration parameters when supported by the selected network.

11. A computer-readable memory storage medium having computer executable instructions for implementing the method of claim 9, wherein presenting the other window comprises: presenting at least one of a hot spot for triggering a process to open a meeting support tool, a hot spot for sharing a data folder, and a hot spot for connecting to a data display.

12. A method of presenting a user interface for participation in ad-hoc wireless networks comprising:
 displaying a window having a plurality of input fields corresponding to participation in the ad-hoc wireless network;
 receiving a selection of the ad-hoc wireless network name used for one of selecting an existing wireless network from a list of available wireless networks and receiving characters comprising a name to be associated with a new ad-hoc wireless network;
 receiving a selection of the ad-hoc wireless network password;
 wherein the ad-hoc wireless network name and ad-hoc wireless network password are passed to a process supporting participation in the ad-hoc wireless network.

13. The method of claim 12, further comprising presenting a selection region associated with displaying suppressed password characters.

14. The method of claim 12, further comprising presenting a selection region for sharing an Internet connection among participants in the ad-hoc wireless network.

15. The method of claim 12, further comprising presenting a selection region for sharing a data folder among participants in the ad-hoc wireless network.

16. The method of claim 12, wherein receiving a selection of the ad-hoc wireless network password comprises receiving zero or more characters for use by another participant in accessing a new ad-hoc wireless network.

17. The method of claim 12, further comprising receiving a selection of a security type for defining security conditions associated with a new ad-hoc wireless network.

18. The method of claim 12, wherein receiving a selection of the ad-hoc wireless network password comprises receiving characters associated with a password for an existing ad-hoc wireless network.

* * * * *